US010033444B2

United States Patent
Capar et al.

(10) Patent No.: US 10,033,444 B2
(45) Date of Patent: Jul. 24, 2018

(54) SYSTEMS AND METHODS OF BEAM TRAINING FOR HYBRID BEAMFORMING

(71) Applicant: Telefonaktiebolaget LM Ericsson (publ), Stockholm (SE)

(72) Inventors: Cagatay Capar, Santa Clara, CA (US); Songnam Hong, Cupertino, CA (US); Dennis Hui, Sunnyvale, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/150,604

(22) Filed: May 10, 2016

(65) Prior Publication Data
US 2016/0337016 A1 Nov. 17, 2016

Related U.S. Application Data

(60) Provisional application No. 62/159,725, filed on May 11, 2015.

(51) Int. Cl.
| | |
|---|---|
| H04B 7/04 | (2017.01) |
| H04B 7/06 | (2006.01) |
| H04B 7/08 | (2006.01) |
| H04W 16/28 | (2009.01) |
| H04B 7/0456 | (2017.01) |

(52) U.S. Cl.
CPC ......... *H04B 7/0456* (2013.01); *H04B 7/0617* (2013.01); *H04B 7/0639* (2013.01); *H04B 7/0695* (2013.01); *H04W 16/28* (2013.01)

(58) Field of Classification Search
CPC .. H04B 7/0456; H04B 7/0617; H04B 7/0639; H04B 7/0695; H04W 16/28
See application file for complete search history.

(56) References Cited

U.S. PATENT DOCUMENTS

| | | | |
|---|---|---|---|
| 9,362,994 B2 | 6/2016 | Seol et al. | |
| 2008/0013642 A1* | 1/2008 | Nam | H04B 7/0619 375/267 |
| 2010/0216483 A1* | 8/2010 | Tynderfeldt | H04B 7/0617 455/450 |
| 2011/0044356 A1* | 2/2011 | Hadad | H04W 24/10 370/480 |

(Continued)

OTHER PUBLICATIONS

International Search Report and Written Opinion for International Patent Application No. PCT/IB2016/052702, dated Jul. 13, 2016, 14 pages.

*Primary Examiner* — David B. Lugo

(74) *Attorney, Agent, or Firm* — Withrow & Terranova, PLLC

(57) ABSTRACT

Systems and methods of beam training for hybrid beamforming are disclosed. In some embodiments, a method of operation of a receiver includes identifying multiple sets of beam indices for use with transmissions from a transmitter using hybrid precoding. The method also includes communicating the sets of beam indices to the transmitter for use with transmissions using hybrid precoding and receiving a transmission from the transmitter using one of the sets of beam indices. In some embodiments, each set of beam indices is for a different transmission mode. In this way, a transmission mode may be changed without the need to perform re-training of beams which is typically a time consuming process.

29 Claims, 11 Drawing Sheets

(56) References Cited

U.S. PATENT DOCUMENTS

| | | | |
|---|---|---|---|
| 2012/0213169 A1* | 8/2012 | Wang | H04B 7/04 |
| | | | 370/329 |
| 2014/0334566 A1 | 11/2014 | Kim et al. | |
| 2015/0030091 A1* | 1/2015 | El-Najjar | H04B 7/0413 |
| | | | 375/267 |
| 2016/0344455 A1* | 11/2016 | Kim | H04B 7/0413 |

* cited by examiner

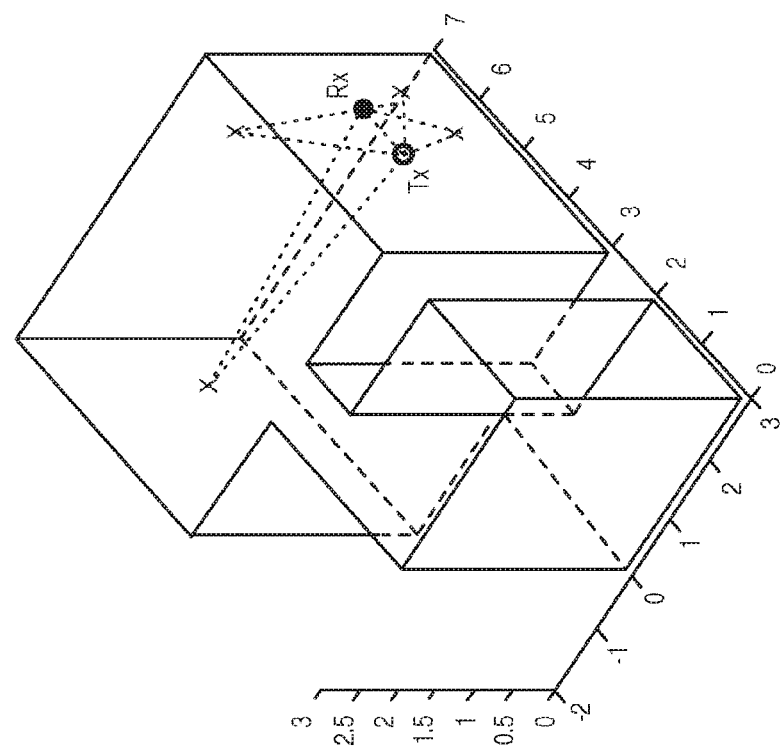
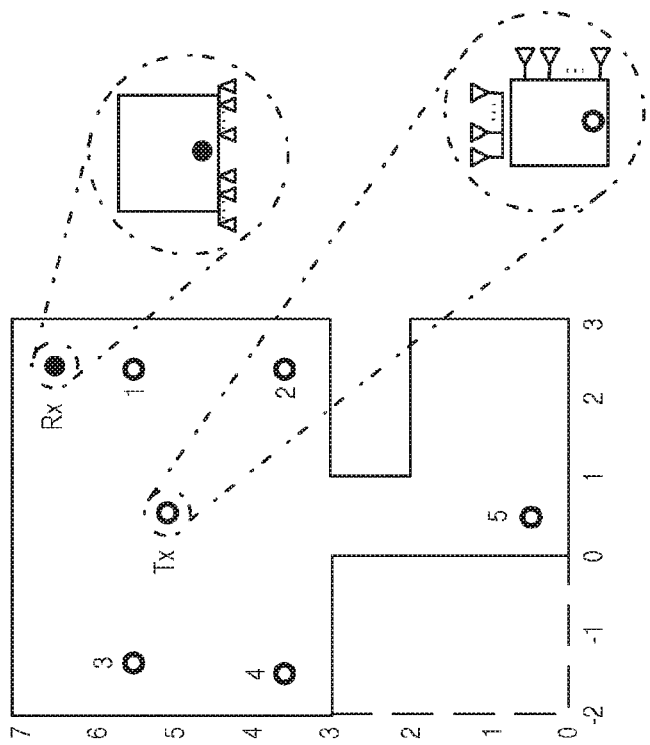
FIG. 3

SYSTEMS AND METHODS OF BEAM TRAINING FOR HYBRID BEAMFORMING

RELATED APPLICATIONS

This application claims the benefit of provisional patent application Ser. No. 62/159,725, filed May 11, 2015, the disclosure of which is hereby incorporated herein by reference in its entirety.

TECHNICAL FIELD

The present disclosure relates to hybrid beamforming in wireless communication.

BACKGROUND

Devices based on Institute of Electrical and Electronics Engineers (IEEE) 802.11ad standard for the 60 Gigahertz (GHz) millimeter Wave (mmW) frequency band are being deployed in conjunction with IEEE 802.11 devices operating in frequencies below 6 GHz to provide improved user experience and expand the market for Wireless Local Area Networks (WLANs). Despite the enhanced capacity provided by the IEEE 802.11ad directional multi-gigabit devices, wireless LAN usages continue to grow and find new applications demanding additional capacity. For example, it is highly desirable to replace wired interfaces such as Ethernet, High-Definition Multimedia Interface (HDMI), Universal Serial Bus (USB), and DisplayPort whose speed can far exceed 10 Gigabits per second (Gbps) with wireless interfaces. In addition, there are other usages such as cellular offload, wireless docking, wireless display, and outdoor/indoor wireless backhaul. Therefore, there is a need to substantially increase the achievable throughput of IEEE 802.11ad devices and the overall capacity of IEEE 802.11 deployments, which is the main goal of the new IEEE 802.11ay amendment. In particular, Multiple-Input Multiple-Output (MIMO) transmission is considered as a key technology in IEEE 802.11ay to improve the data throughput of IEEE 802.11ad.

In some instances, an mmW communication system (e.g., IEEE 802.11ad) is operating with high number of antennas and very limited number of analog Radio Frequency (RF) chains. A large number of antennas is used to extend the communication range for recovering the high path loss while fewer analog RF chains are designed to reduce transmit, processing power, and hardware complexity. Due to the limited number of RF chains, the digital signal processor at Baseband (BB) frequency cannot apply individual fast-changing precoding weight or antenna weight to every antenna element to achieve the conventional fully digital preceding for MIMO transmissions at the transmitter or the conventional fully digital coherent combining at the receiver. Instead, only a slow-changing phase shift can be applied to each individual antenna element at the RF front-end to steer a beam towards the desired direction for each RF chain. Such a slow beam steering mechanism is commonly referred to as analog Beamforming (BF). On the other hand, the digital processor can apply a fast-changing preceding weight at BB to each RF chain. The application of such precoding weight per RF chain is referred to as baseband precoding. The combination of the analog BF and baseband preceding is commonly called hybrid beamforming.

Before any communication starts between two devices, the devices need to align their beam pointing angles towards each other. An efficient searching process to identify the best beam angle pair (a transmit beam and a receive beam) is therefore needed. This process is called beam training, which typically takes a significant amount of time to complete due to the numerous possible different combinations of transmit and receive beam directions to scan through. Due to the transmission of a single stream, beam selection criterion is clear, i.e., finding a beam pair to maximize the received signal power. In IEEE 802.11ay (enhanced version of IEEE 802.11ad), however, hybrid precoding will be used to multiplex several data streams together thereby improving throughput. As such, the current beam selection criterion (i.e., maximizing the received power) is no longer optimal.

Therefore, there is a need for a beam training protocol suitable for hybrid precoding, especially for multiple streams or different transmission modes.

SUMMARY

Systems and methods of beam training for hybrid beamforming are disclosed. In some embodiments, a method of operation of a receiver includes identifying multiple sets of beam indices for use with transmissions from a transmitter using hybrid precoding. The method also includes communicating the sets of beam indices to the transmitter for use with transmissions using hybrid precoding and receiving a transmission from the transmitter using one of the sets of beam indices. In some embodiments, each set of beam indices is for a different transmission mode. In this way, a transmission mode may be changed without the need to perform re-training of beams, which is typically a time consuming process.

In some embodiments, identifying a set of beam indices for each transmission mode includes identifying a set of beam indices for each transmission mode that optimizes a predefined performance metric for that transmission mode.

In some embodiments, the receiver receives an indication of the transmission modes from the transmitter. In some embodiments, the transmission modes include predefined transmission modes.

In some embodiments, the transmission modes include Multiple-Input Multiple-Output (MIMO) transmission modes. In some embodiments, the MIMO transmission modes include one or more MIMO transmission modes using different space-time-codes for diversity transmissions. In some embodiments, the MIMO transmission modes include one or more MIMO transmission modes using different numbers of streams used for spatial multiplexing.

In some embodiments, the sets of beam indices for use with the transmissions from the transmitter using hybrid precoding include a set of beam indices for antennas associated with the transmitter. In some embodiments, the sets of beam indices for use with transmissions from the transmitter using hybrid precoding include sets of beam indices for the antennas associated with the receiver.

In some embodiments, identifying the sets of beam indices also includes identifying values corresponding to the predefined performance metric for each of the sets of beam indices, and communicating the sets of beam indices to the transmitter also includes communicating the values corresponding to the predefined performance metric for one or more of the sets of beam indices to the transmitter.

In some embodiments, at least one of the predefined performance metrics is an indication of a signal strength for the transmission mode. In some embodiments, at least one of the predefined performance metrics is an indication of a data throughput for the transmission mode. In some embodiments, the transmitter and the receiver operate using a millimeter wave technology. In some embodiments, the transmitter and the receiver operate according to the IEEE 802.11ay standard.

In some embodiments, a method of operation of a transmitter includes obtaining multiple sets of beam indices for use with transmissions to a receiver using hybrid precoding; selecting one of the sets of beam indices for use with transmissions to the receiver using hybrid precoding; and transmitting a transmission to the receiver using the selected one of the sets of beam indices.

In some embodiments, the method also includes indicating to the receiver multiple transmission modes, wherein obtaining the sets of beam indices includes obtaining a set of beam indices for one or more transmission modes.

In some embodiments, the set of beam indices for each transmission mode optimizes a predefined performance metric for that transmission mode. In some embodiments, the transmission modes include MIMO transmission modes. In some embodiments, the MIMO transmission modes include one or more MIMO transmission modes using different space-time-codes for diversity transmissions. In some embodiments, the MIMO transmission modes include one or more MIMO transmission modes using different numbers of streams used for spatial multiplexing.

In some embodiments, the sets of beam indices for use with transmissions from the transmitter using hybrid precoding include sets of beam indices for antennas associated with the transmitter. In some embodiments, the sets of beam indices for use with transmissions from the transmitter using hybrid precoding includes sets of beam indices for antennas associated with the receiver.

In some embodiments, obtaining the sets of beam indices also includes obtaining values corresponding to the predefined performance metric for one or more of the sets of beam indices. In some embodiments, the predefined performance metrics are an indication of a signal strength for the transmission mode. In some embodiments, the predefined performance metrics are an indication of a data throughput for the transmission mode.

In some embodiments, the method also includes determining to change a transmission mode for transmissions to the receiver. Based on the change in the transmission mode, the method includes selecting a different one of the sets of beam indices for use with the transmissions to the receiver using hybrid precoding; and transmitting a transmission to the receiver using the different selected one of the sets of beam indices.

In some embodiments, the method also includes obtaining second sets of beam indices for use with transmissions to a second receiver using hybrid precoding. The method also includes selecting one of the second sets of beam indices for use with transmissions to the second receiver using hybrid precoding; and at the same time as transmitting the transmission to the receiver, transmitting a second transmission to the second receiver using the selected one of the second sets of beam indices.

In some embodiments, selecting one of the sets of beam indices and selecting one of the second sets of beam indices includes selecting the one of the sets of beam indices for use with transmissions to the receiver and selecting the one of the second sets of beam indices for use with transmissions to the second receiver in order to optimize a combined data throughput to the receiver and the second receiver.

In some embodiments, the transmitter and the receiver operate using a millimeter wave technology. In some embodiments, the transmitter and the receiver operate according to the IEEE 802.11ay standard.

In some embodiments, a receiver includes multiple antennas and circuitry. The circuitry is configured to: identify multiple sets of beam indices for use with transmissions from a transmitter using hybrid precoding; communicate the sets of beam indices to the transmitter for use with transmissions using hybrid precoding; and receive a transmission from the transmitter using one of the sets of beam indices.

In some embodiments, a transmitter includes multiple antennas and circuitry. The circuitry is configured to obtain multiple sets of beam indices for use with transmissions to a receiver using hybrid precoding; select one of the sets of beam indices for use with transmissions to a receiver using hybrid precoding; and transmit a transmission to the receiver using the selected one of the sets of beam indices.

In some embodiments, a receiver is adapted to identify multiple sets of beam indices for use with transmissions from a transmitter using hybrid precoding; communicate the sets of beam indices to the transmitter for use with transmissions using hybrid precoding; and receive a transmission from the transmitter using one of the sets of beam indices. In some embodiments, the receiver is adapted to perform the method of any of the previous embodiments.

In some embodiments, a computer program includes instructions which, when executed on at least one processor, cause the at least one processor to carry out the method of any of the previous embodiments.

In some embodiments, a carrier contains the computer program where the carrier is one of an electronic signal, an optical signal, a radio signal, or a computer readable storage medium.

In some embodiments, a transmitter is adapted to obtain multiple sets of beam indices for use with transmissions to a receiver using hybrid precoding; select one of the sets of beam indices for use with transmissions to a receiver using hybrid precoding; and transmit a transmission to the receiver using the selected one of the sets of beam indices. In some embodiments, the receiver is adapted to perform the method of any of the previous embodiments.

In some embodiments, a computer program includes instructions which, when executed on at least one processor, cause the at least one processor to carry out the method according to any of the previous embodiments.

In some embodiments, a carrier contains the computer program where the carrier is one of an electronic signal, an optical signal, a radio signal, or a computer readable storage medium.

In some embodiments, a receiver includes a beam index identification adjustment module operative to identify multiple sets of beam indices for use with transmissions from a transmitter using hybrid precoding; and a communication module operative to communicate the sets of beam indices to the transmitter for use with transmissions using hybrid precoding and receive a transmission from the transmitter using one of the sets of beam indices.

In some embodiments, a transmitter includes a beam index module operative to obtain multiple sets of beam indices for use with transmissions to a receiver using hybrid precoding and select one of the sets of beam indices for use with transmissions to the receiver using hybrid precoding; and a communication module operative to transmit a transmission to the receiver using the selected one of the sets of beam indices.

In some embodiments, a non-transitory computer readable medium stores software instructions that when executed by a processor of a receiver cause the receiver to identify multiple sets of beam indices for use with transmissions from a transmitter using hybrid precoding; communicate the sets of beam indices to the transmitter for use with transmissions from the transmitter using hybrid precoding; and receive a transmission from the transmitter using one of the sets of beam indices.

In some embodiments, a non-transitory computer readable medium stores software instructions that when executed by a processor of a transmitter cause the transmitter to obtain multiple sets of beam indices for use with transmissions to a receiver using hybrid precoding; select one of the sets of beam indices for use with transmissions to the receiver using hybrid precoding; and transmit a transmission to the receiver using the selected one of the sets of beam indices.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 3 illustrates an indoor environment and antenna configurations used for simulations of communication between a transmitter and a receiver, according to some embodiments of the present disclosure;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
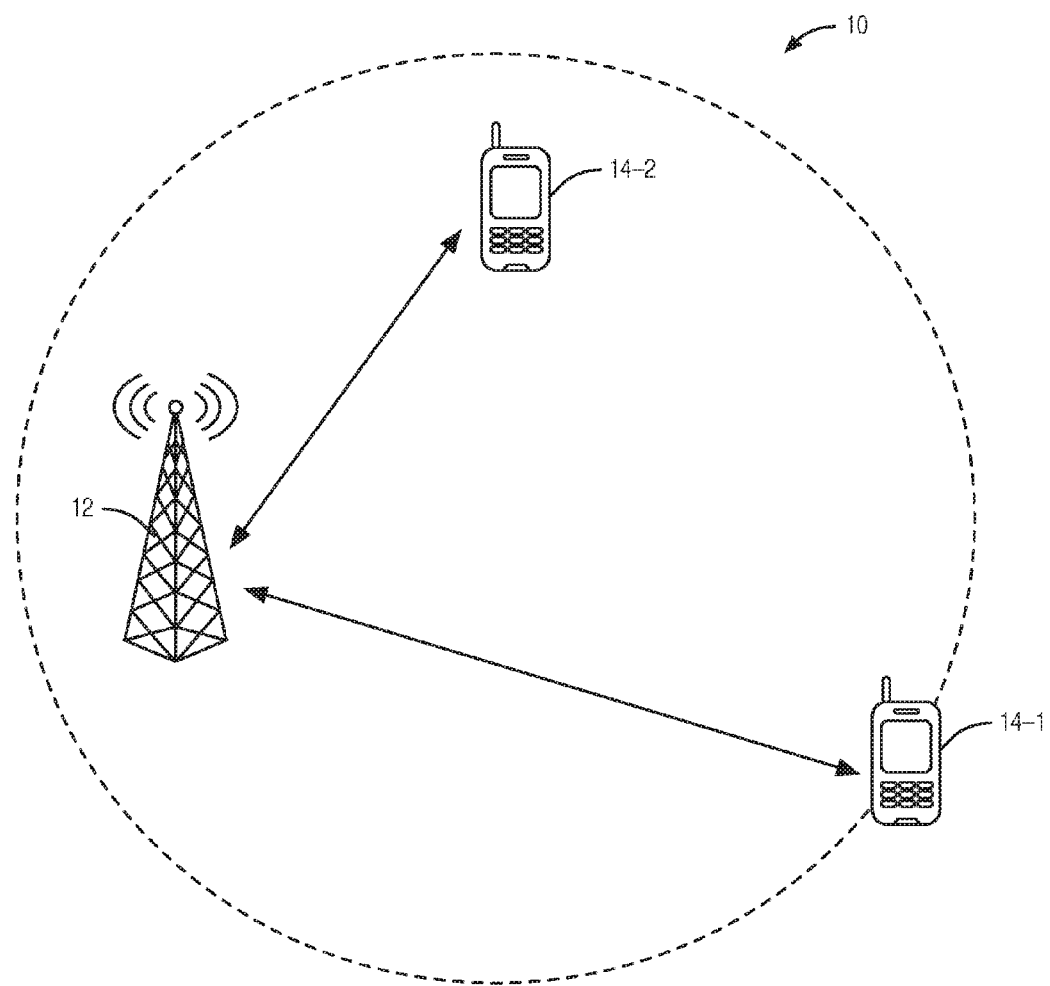
FIG. 1 illustrates a wireless communication network with multiple wireless devices and a network node, according to some embodiments of the present disclosure.

FIG. 1 illustrates a wireless communication network 10 with a transmitter 12 and multiple receivers 14-1 and 14-2, according to some embodiments of the present disclosure. In some embodiments herein, the receivers 14-1 and 14-2 (sometimes referred to herein as receiver 14 and receivers 14) are wireless devices, and the transmitter 12 is a network node. While the terms transmitter and receiver may seem like one-way communication, the present disclosure is not limited thereto. In fact, the transmitter 12 may also receive communications from the receiver 14. Therefore, any discussion herein regarding a transmitter 12 may be equally applicable to a receiver 14 and vice versa.

Notably, much of the discussion herein focuses on embodiments in which the wireless communication network 10 is an Institute of Electrical and Electronics Engineers (IEEE) 802.11ay standard for the 60 Gigahertz (GHz) millimeter Wave (mmW) network. As such, IEEE terminology is oftentimes used herein. However, while the embodiments described herein focus on IEEE 802.11ay, the embodiments and concepts disclosed herein may be used in any suitable type of existing or future wireless communication network including, for example, $3^{rd}$ Generation (3G) networks (e.g. Universal Mobile Telecommunications System (UMTS)), $4^{th}$ Generation (4G) networks (Worldwide Interoperability for Microwave Access (WiMAX), Long Term Evolution (LTE), Long Term Evolution Advanced (LTE-A)), $5^{th}$ Generation (5G) or other future networks.

In FIG. 1, transmitter 12 is shown serving a first receiver 14-1 and a second receiver 14-2. In this example, receiver 14-1 is on or near the border of transmissions from transmitter 12. As such, receiver 14-1 might be able to obtain a better signal by using beamforming to communicate with the transmitter 12.

As discussed above, in some instances, wireless communication network 10 (e.g., IEEE 802.11ad or IEEE 802.11ay) is operating with a high number of antennas and very limited number of analog Radio Frequency (RF) chains. A large number of antennas is used to extend the communication range for recovering the high path loss while fewer analog RF chains are designed to reduce transmit, processing power, and hardware complexity. Due to the limited number of RF chains, the digital signal processor at Baseband (BB) frequency cannot apply individual fast-changing precoding weight or antenna weight to every antenna element to achieve the conventional fully digital precoding for MIMO transmissions at the transmitter or the conventional fully digital coherent combining at the receiver. Instead, only a slow-changing phase shift can be applied to each individual antenna element at the RF front-end to steer a beam towards the desired direction for each RF chain. Such a slow beam steering mechanism is commonly referred to as analog Beamforming (BF). On the other hand, the digital processor can apply a fast-changing precoding weight at BB to each RF chain. The application of such precoding weight per RF chain is referred to as baseband precoding. The combination of the analog BF and baseband precoding is commonly called hybrid beamforming.

Figure 2:
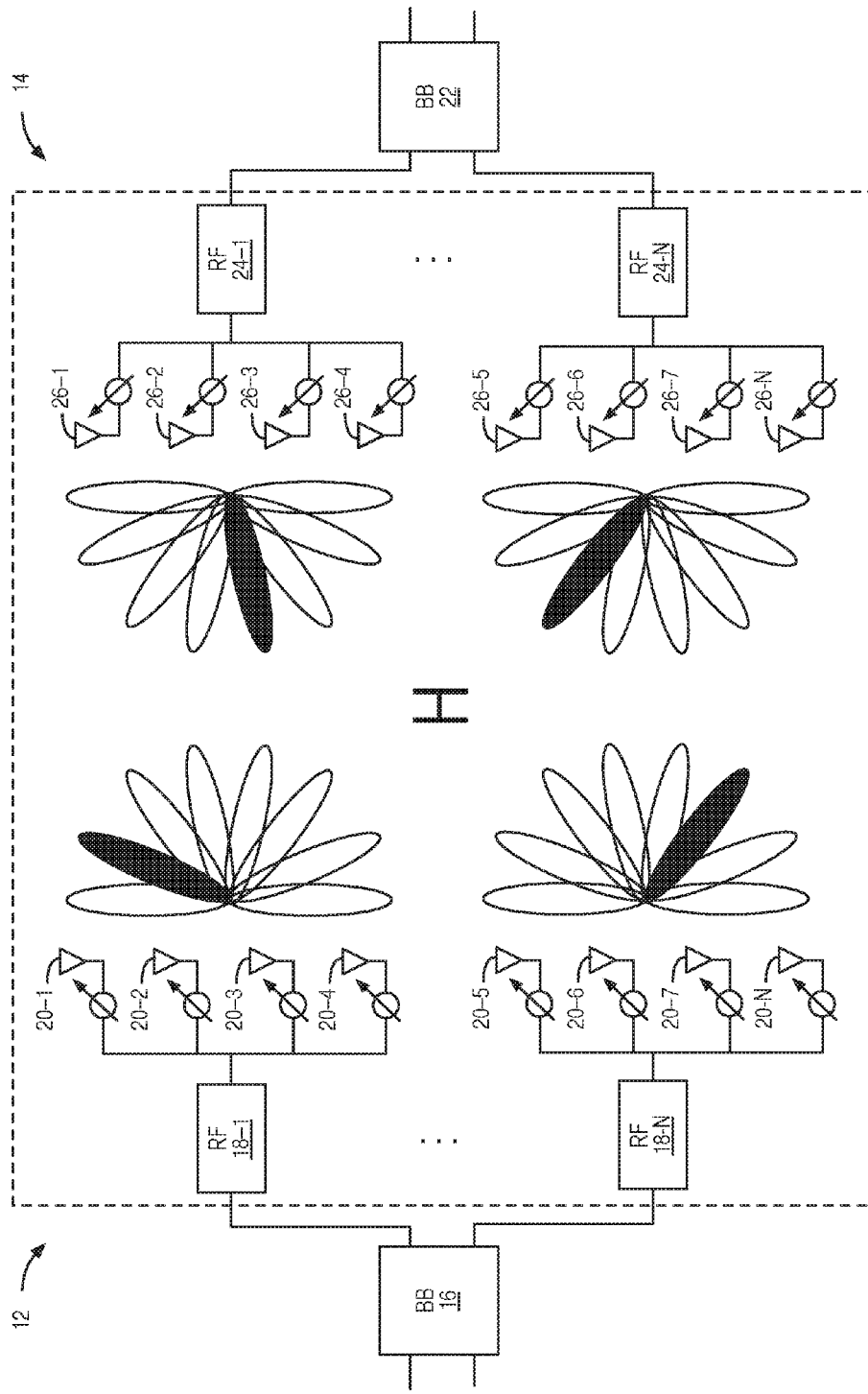
FIG. 2 is a schematic diagram of a transmitter and receiver employing hybrid beamforming, according to some embodiments of the present disclosure.

FIG. 2 is a schematic diagram of a transmitter 12 and receiver 14 employing hybrid beamforming, according to some embodiments of the present disclosure. As shown, transmitter 12 includes a BB processing module 16 which connects to multiple RF chains 18-1 through 18-N. Each RF chain 18 includes one or more antennas 20-1 through 20-N. The receiver 14 similarly includes a BB processing module 22 which connects to multiple RF chains 24-1 through 24-N. Each RF chain 24 includes one or more antennas 26-1 through 26-N.

As discussed above, a slow-changing phase shift can be applied to each individual antenna element 20, 26 at the RF front-end to steer a beam towards the desired direction for each RF chain 18, 24. Examples of potential beam directions are shown as elongated ellipses. The darkened ellipses indicate the current beam direction for the antennas of that particular RF chain 18, 24. The concatenation of the physical channel and the analog beamformer forms an effective composite channel between BB 16 and BB 22 as denoted by H.

Before any communication starts between two devices such as transmitter 12 and receiver 14, the devices need to align their beam pointing angles towards each other. An efficient searching process to identify the best beam angle pair (a transmit beam and a receive beam) is therefore needed. This process is called beam training, which typically takes a significant amount of time to complete due to the numerous possible different combinations of transmit and receive beam directions to scan through. Due to the transmission of a single stream, beam selection criterion is clear for IEEE 802.11ad, i.e., finding a beam pair to maximize the received signal power. In IEEE 802.11ay (enhanced version of IEEE 802.11ad), however, hybrid precoding is used to multiplex several data streams together, thereby improving data throughput. As such, the current beam selection criterion (i.e., maximizing the received power) is no longer optimal and there is a need for a beam training protocol suitable for hybrid precoding, especially for multiple streams or different transmission modes.

Also, in IEEE 802.11ay, having various different MIMO transmission modes, such as spatial multiplexing, space-time code, etc., to choose from is expected. Finding beam pairs with the same criterion of maximizing the receiver power may no longer be optimal. Furthermore, the optimal beam pairs can be different according to MIMO modes (even just for different numbers of streams in spatial multiplexing).

As an example of this, FIG. 3 illustrates an indoor environment and antenna configurations used for simulations of communication between a transmitter 12 and a receiver 14, according to some embodiments of the present disclosure. In this example, a studio apartment room plan is shown with transmitter 12 shown as Tx and receiver 14 shown as Rx. As illustrated, both the transmitter 12 and receiver 14 include multiple antennas that can be pointed in various directions to transmit and receive, respectively.

The left side of FIG. 3 illustrates five different transmission beam directions for the transmitter 12. The right side of FIG. 3 illustrates possible paths to the receiver 14 based on the different beam directions. Some directions do not even result in the signal being received at the receiver 14. Other beam directions result in reception after being reflected off a surface such as a wall. Determining the best beam directions can greatly increase data throughput.

Figure 4:
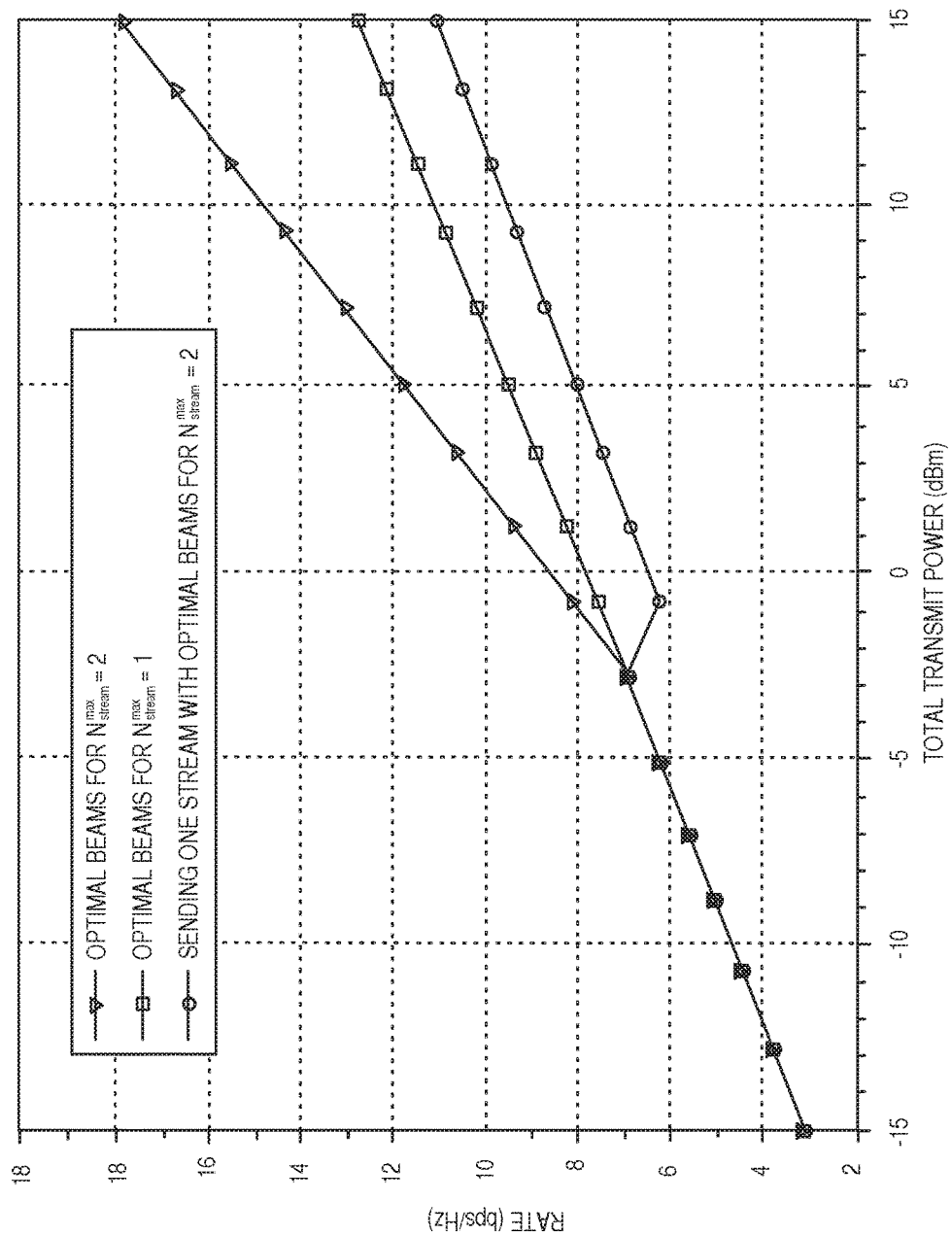
FIG. 4 illustrates achievable data rates of hybrid precoding, according to some embodiments of the present disclosure.

FIG. 4 illustrates achievable data rates of hybrid precoding, according to some embodiments of the present disclosure. Specifically, FIG. 4 shows some simulation results of mmW communications in the indoor environment illustrated in FIG. 3. As shown in FIG. 4, using the beams selected optimally for 2-stream spatial multiplexing for 1-stream transmission induces a significant loss in effective transmit power and thus Signal-to-Noise Ratio (SNR). Therefore, the best set of beam directions for one MIMO mode can be far from optimal for another MIMO mode. Since the beam training typically consumes lots of time and radio resources to complete, re-training the beam directions whenever a MIMO mode is changed can lead to undesired service interruption.

According to some embodiments described herein, during the beam training process, different performance metrics can be used to identify multiple sets of beam indices for the analog beamformer, each set for one possible MIMO transmission mode. The multiple sets are then fed back to the transmitter 12 so that the transmitter 12 can switch between different transmission modes, such as different numbers of spatially multiplexing data streams, different space-time coding schemes, etc., without performing re-training of beams, which is typically a time consuming process.

In some embodiments, a set of beam indices is an ordered tuple of beam indices. As an example, a set of beam indices indicating (7,5) (i.e., "use beam number 7 for the transmit antenna array number 1, and use beam number 5 for the transmit antenna array number 2") is different than indicating (5,7) (i.e., "use beam number 5 for the transmit antenna array number 1, and use beam number 7 for the transmit antenna array number 2"). Also, in some embodiments one or more of the beam indices may be a NULL beam index to indicate that a particular transmit antenna array should not be used. For example, indicating (NULL, 5) may mean "do not transmit from antenna array number 1, transmit only from transmit antenna array number 2, and use beam number 5 on that array." A NULL beam index may be indicated in various ways depending on implementation.

Figure 5:
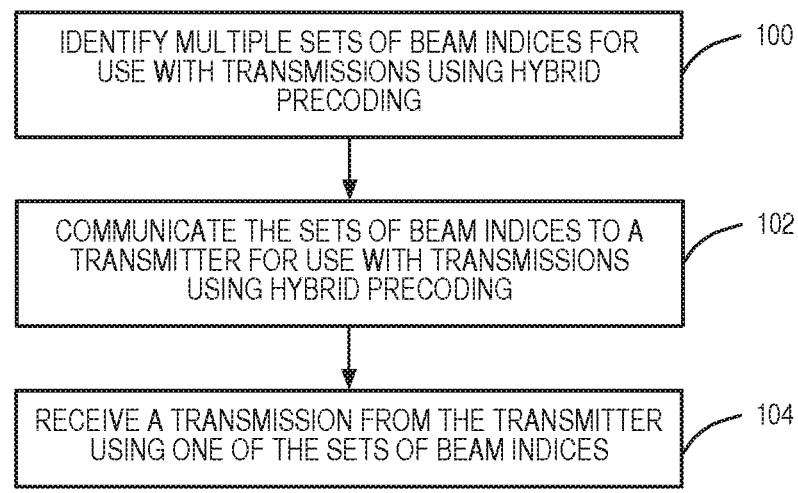
FIG. 5 illustrates a process for identifying and communicating sets of beam indices for use with transmissions, according to some embodiments of the present disclosure.

The list of possible MIMO transmission modes, for which the receiver should identify a set of optimal beam indices for the analog beamformer, can be explicitly communicated by the transmitter before the beam training process, implicitly implied by the parameters set for the beam training, or pre-defined in the standard. As such, FIG. 5 illustrates a process for identifying and communicating sets of beam indices for use with transmissions, according to some embodiments of the present disclosure. First, a receiver 14 identifies multiple sets of beam indices for use with transmissions using hybrid precoding (step 100). In some embodiments, each set of beam indices is for a different transmission mode such as a MIMO transmission mode. The receiver 14 may receive an indication of the possible transmission modes from the transmitter or may already have a set of predefined transmission modes, perhaps from some standard specification.

In some embodiments, identifying the multiple sets includes identifying a set of beam indices for each transmission mode (or some subset of the transmission modes) that optimizes a predefined performance metric for that transmission mode. The metric may include an SNR value, data throughput, or some other suitable metric.

The receiver 14 then communicates the sets of beam indices to a transmitter 12 for use with transmissions using hybrid precoding (step 102). In some embodiments, this communication may also include communicating the values corresponding to the predefined performance metric for one or more of the sets of beam indices to the transmitter 12.

As discussed below in more detail, the transmitter 12 may choose one of these sets of beam indices to use for transmitting to the receiver 14. As a result, the receiver 14 receives a transmission from the transmitter 12 using one of the sets of beam indices (step 104).

Similarly, according to other embodiments described herein, the transmitter 12 may receive multiple sets of beam indices for a list of possible MIMO transmission modes and the associated performance metrics from two or more receivers 14. Based on these sets of beam indices, the transmitter 12 can perform Multi-User MIMO (MU-MIMO) transmissions to these receivers 14 simultaneously using the same radio resources. Knowing multiple sets of beam indices from different receivers 14 allows the transmitter to select the best MIMO transmission mode for each receiver so as to maximize the total data throughput or the spectral efficiency.

Figure 6:
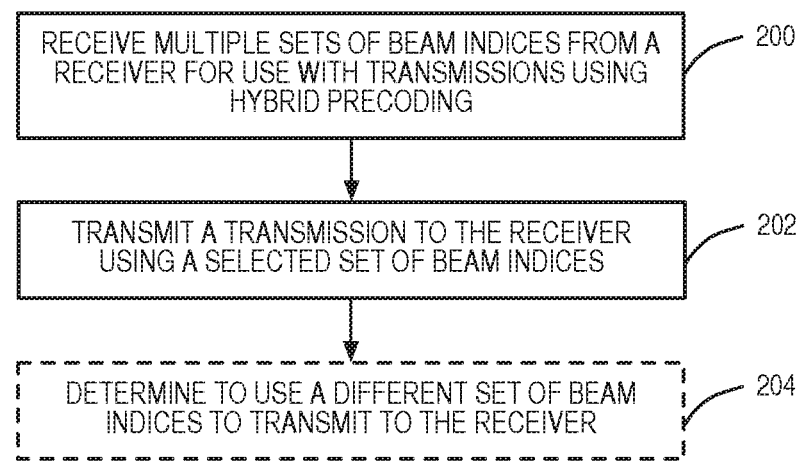
FIG. 6 illustrates a process for receiving and using sets of beam indices for use with transmissions, according to some embodiments of the present disclosure.

As such, FIG. 6 illustrates a process for receiving and using sets of beam indices for use with transmissions, according to some embodiments of the present disclosure. Transmitter 12 receives multiple sets of beam indices from receiver 14 for use with transmissions using hybrid precoding (step 200). In some embodiments, a set of beam indices includes beam indices for antennas associated with the transmitter 12 and/or beam indices for antennas associated with the receiver 14.

The transmitter 12 then transmits a transmission to the receiver 14 using a selected set of beam indices (step 202). This set of beam indices can be chosen in several ways. For example, the transmitter 12 may choose the best set based on some predefined metric. If the multiple sets correspond to different transmission modes, then the transmitter 12 may select the set of beam indices that were indicated for the particular transmission mode selected for the transmission. In some embodiments, the transmitter 12 may also indicate to the receiver 14 which transmission mode it selected so that the receiver 14 knows right away which beams it should listen on for the upcoming actual transmission.

Also, if the sets included the values for the predefined metric associated with the set of beam indices, the transmitter 12 may be able to make a more informed decision. For instance, the two receivers 14-1 and 14-2 of FIG. 1 may report multiple beam indices for different MIMO transmission modes using different numbers of streams used for spatial multiplexing. In this case, the values of the predefined metrics for the two receivers 14-1 and 14-2 may be very different. The transmitter may determine that transmitting with spatial multiplexing to receiver 14-1 using a single stream and transmitting with spatial multiplexing to receiver 14-2 using multiple streams may maximize the overall data throughput. While this example only uses two receivers 14, the current disclosure is not limited thereto. The transmitter 12 may make similar decisions for multiple receivers 14 in general. Also, while this example maximizes the overall data throughput, any other metric could be used. For example, the transmitter 12 may try to maximize "fairness" among receivers, e.g., by trying to maximize the data throughput of the "worst receiver" instead of trying to maximize the total data throughput. Also the metric may be some metric other than data throughput and can be any predefined metric mentioned elsewhere in this disclosure or any suitable metric.

FIG. 6 also shows that the transmitter 12 may optionally determine to use a different set of beam indices to transmit to the receiver 14 (step 204); for instance, if it is determined to change the transmissions from one transmission mode to a different transmission mode. Previously, such a change would require a new round of beam training to determine the best beam directions for the new transmission mode. By already having multiple sets of beam indices, the transmitter 12 is able to change to the best beam indices quickly, saving time and increasing throughput.

For example, some embodiments described herein allow the transmitter 12 to switch MIMO transmission modes with the optimal set of analog beam directions without going through the beam re-training. For example, when the receiver 14 detects a degraded Signal-to-Interference-plus-Noise Ratio (SINK) due to an increase of interference level in its vicinity, it may quickly indicate a preferred change of MIMO mode (e.g. reduction in the number of data streams) to the transmitter 12, and the transmitter 12 can then switch to a new set of beam directions according to the new MIMO mode. This allows the communication between the transmitter 12 and the receiver 14 to be maintained at the highest data rate possible.

As discussed above, determining the optimal set of beam indices for a given transmission mode may be more complicated than simply maximizing the received power at the receiver 14. Consider a transmitter 12 equipped with $L_T$ transmit antenna arrays and a receiver equipped with $L_R$ antenna arrays. Let $n_{T,i}$ be the number of antennas in the $i^{th}$ transmit antenna array, for $i=1, 2, \ldots, L_T$, and $n_{R,j}$ be the number antennas in the $j^{th}$ receive antenna array, for $j=1, 2, \ldots, L_R$. FIG. 2 shows a special case with $L_T=L_R=2$. Let $G_{ij}$ denote the MIMO channel from the $j^{th}$ transmit antenna array to the $i^{th}$ receive antenna array. Let $$G = \begin{bmatrix} G_{11} & G_{12} & \ldots & G_{1L_T} \\ G_{21} & G_{22} & \ddots & G_{2L_T} \\ \vdots & \ddots & \ddots & \vdots \\ G_{L_R 1} & G_{L_R 2} & \ldots & G_{L_R L_T} \end{bmatrix}$$

denote the $n_R \Sigma_{i=1}^{L_R} n_{R,i}$ by $n_T = \Sigma_{i=1}^{L_T} n_{T,i}$ full MIMO channel response from all transmit arrays to all receive arrays, where $n_T$ and $n_R$ denotes the number of transmit and receive antennas, respectively.

Let $C_{T,k} = \{p_{T,k}^{(1)}, p_{T,k}^{(2)}, \ldots, p_{T,k}^{(B_{T,k})}\}$ and $C_{R,l} = \{p_{R,l}^{(1)}, p_{R,l}^{(2)}, \ldots, p_{R,l}^{(B_{R,l})}\}$ be the codebooks of beams or beam directions for the $k^{th}$ transmit and $l^{th}$ receive antenna arrays, respectively, where $B_{T,k}$ and $B_{R,l}$ denote the number of beams (or beam directions) in the codebooks $C_{T,k}$ and $C_{R,l}$, respectively. Each transmit beam $p_{T,k}^i$ is a $n_{T,k}$-by-1(column) vector of beamform weights, and each receive beam $p_{T,l}^j$ is a $n_{R,l}$-by-1(column) vector of beamform weights. For a given the index $i_k$ of the beam in $C_{T,k}$ selected for the $k^{th}$ transmit antenna array, and a given index $j_l$ of the beam in $C_{R,l}$ selected for the l receive antenna array, the baseband signal processor sees a composite effective MIMO channel response given by $$H(i,j) = p_R(j)^H G p_T(i)$$

where $i \equiv (i_1, i_2, \ldots, i_{L_T})$ and $j \equiv (j_1, j_2, \ldots, j_{L_R})$, and where $$p_R(j) = \begin{bmatrix} p_{R,1}^{j_1} & 0 & \ldots & 0 \\ 0 & p_{R,2}^{j_2} & \ddots & \vdots \\ \vdots & \ddots & \ddots & 0 \\ 0 & \ldots & 0 & p_{R,L_R}^{j_{L_R}} \end{bmatrix}$$

$$p_T(i) = \begin{bmatrix} p_{T,1}^{i_1} & 0 & \ldots & 0 \\ 0 & p_{T,2}^{i_2} & \ddots & \vdots \\ \vdots & \ddots & \ddots & 0 \\ 0 & \ldots & 0 & p_{T,L_T}^{i_{L_T}} \end{bmatrix}$$

are the composite transmit and receive beams over all transmit and receive antenna arrays, respectively.

For MIMO mode specific beam selection, let $\mathcal{M}$ be a collection of multiple MIMO transmission modes potentially used by the transmitter 12, which is assumed to be known by both the transmitter 12 and the receiver 14 either through prior communications or through predefined standards. For example, these MIMO modes may indicate a different maximum number of streams used in spatial multiplexing or different space-time-codes (or linear dispersive codes) used in diversity transmissions. For each MIMO mode $m \in \mathcal{M}$, let $\mu_m(i,j)$ denote the corresponding metric suitable for measuring the performance when the MIMO mode m is used with the set of beam indices (i,j).

Embodiments described herein propose use of the receiver 14 to identify the optimal set of beam indices $(i_m^*, j_m^*)$ for each $m \in \mathcal{M}$, based on the corresponding performance metric $\mu_m(i,j)$ according to:

$$(i_m^*, j_m^*) \equiv \underset{(i,j)}{\mathrm{argmax}}\, \mu_m(i, j)$$

during the beam training process, and then feed back the optimal sets of transmit beam indices $\{i_m^*\}_{m \in \mathcal{M}}$ to the transmitter 12. Optionally, the receiver 14 may also feed back the optimal set of receive beam indices $\{j_m^*\}_{m \in \mathcal{M}}$, along with the value of the resulting optimal performance metric $\mu_m(i_m^*, j_m^*)$ to the transmitter 12. Based on such feedback, the transmitter 12 can quickly switch from one MIMO mode to another in $\mathcal{M}$ without re-training of beams.

For example, suppose $\mathcal{M}$ represents different maximum number of MIMO data streams for spatial multiplexing, and let $n_{s,max} \in \mathcal{M}$ denote the maximum number of MIMO data streams to be sent by the transmitter over $N_f$ frequency subcarriers in an Orthogonal Frequency-Division Multiple Access (OFDMA) system. The performance metric $\mu_m$ may be the best achievable sum throughput on the $N_f$ frequencies under a certain total power constraint over all transmit antenna arrays, as defined below:

$$\mu_m(i, j) \equiv \max_{[\Phi_f]_{f=1}^{N_f}} \sum_{f=1}^{N_f} \log\det(I + H(i, j)\Phi_f H(i, j)^H)$$

subject to $$\sum_{f=1}^{N_f} tr(\Phi_f) = P_{total} \text{ and } \mathrm{Rank}(\Phi_f) \le n_{s,max}$$

Alternatively, if $\mathcal{M}$ represents different maximum numbers of MIMO data streams for diversity transmissions, the performance metric $\mu_m$ may be given by $$\mu_m(i,j) \equiv \sup\{C > 0 : Pr(\log \det(I + H(i,j)\Phi_f H(i,j)^H) \le C) \le \epsilon\}$$

subject to $$\sum_{f=1}^{N_f} tr(\Phi_f) = P_{total} \text{ and } \mathrm{Rank}(\Phi_f) \le n_{s,max}.$$

Figure 7:
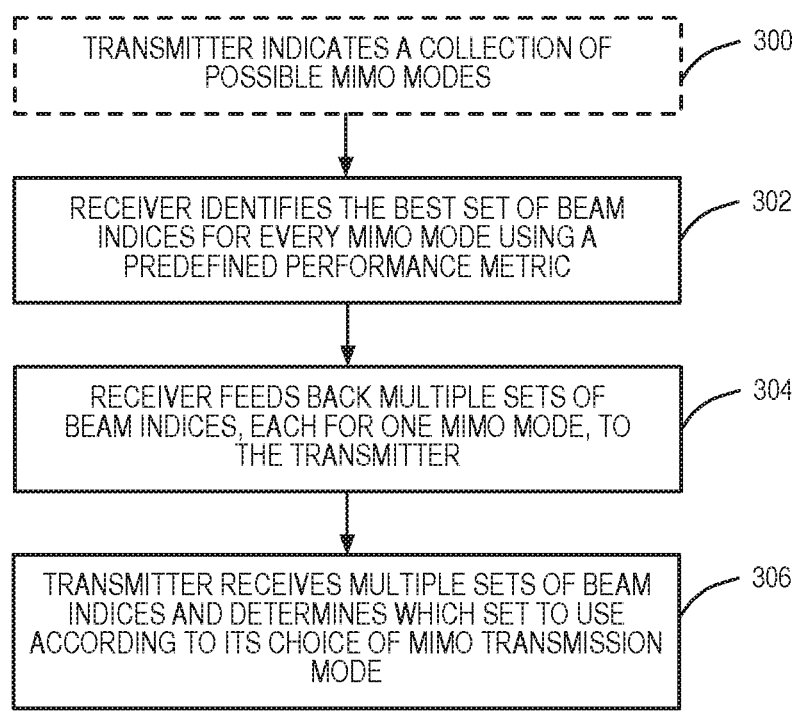
FIG. 7 illustrates a process for receiving and using sets of beam indices for different Multiple-Input Multiple-Output (MIMO) transmission modes, according to some embodiments of the present disclosure.

FIG. 7 illustrates a process for receiving and using sets of beam indices for different MIMO transmission modes, according to some embodiments of the present disclosure. First, the transmitter 12 optionally indicates a collection of possible MIMO modes to the receiver 14 (step 300). The receiver 14 identifies the best set of beam indices for every MIMO mode using a predefined performance metric (step 302). While in this example, only the best set of beam indices is identified, in some embodiments, multiple sets of beam indices may be identified for one or more transmission modes. For example, for a given transmission mode, the receiver 14 may identify a predefined number of sets of beam indices (e.g., the top three sets of beam indices) instead of just the best set. Or, receiver 14 may identify the sets of beam indices that meet some threshold such as a threshold value of the predefined metric. In some embodiments, when indicating these sets, the receiver 14 can choose to also include the ranking of these sets, or the metric values associated with each set, etc.

The receiver 14 feeds back multiple sets of beam indices, each for one MIMO mode, to the transmitter 12 (step 304). The transmitter 12 receives the multiple sets of beam indices and determines which set to use according to its choice of MIMO transmission mode (step 306).

As discussed above, the transmitter 12 may receive multiple sets of beam indices $\{i_m^*\}_{m \in \mathcal{M}}$, and possibly associated $\{j_m^*\}_{m \in \mathcal{M}}$, and $\mu_m(i_m^*, j_m^*)$, from each of two or more receivers 14 that the transmitter 12 is serving simultaneously. In this case, based on the received information, $\{i_m^*\}_{m \in \mathcal{M}}$, $\{j_m^*\}_{m \in \mathcal{M}}$ and $\mu_m(i_m^*, j_m^*)$, the transmitter 12 can determine different transmission modes for each receiver 14 that maximize a certain aggregation performance metric, such as sum throughput over all receivers 14.

Figure 8:
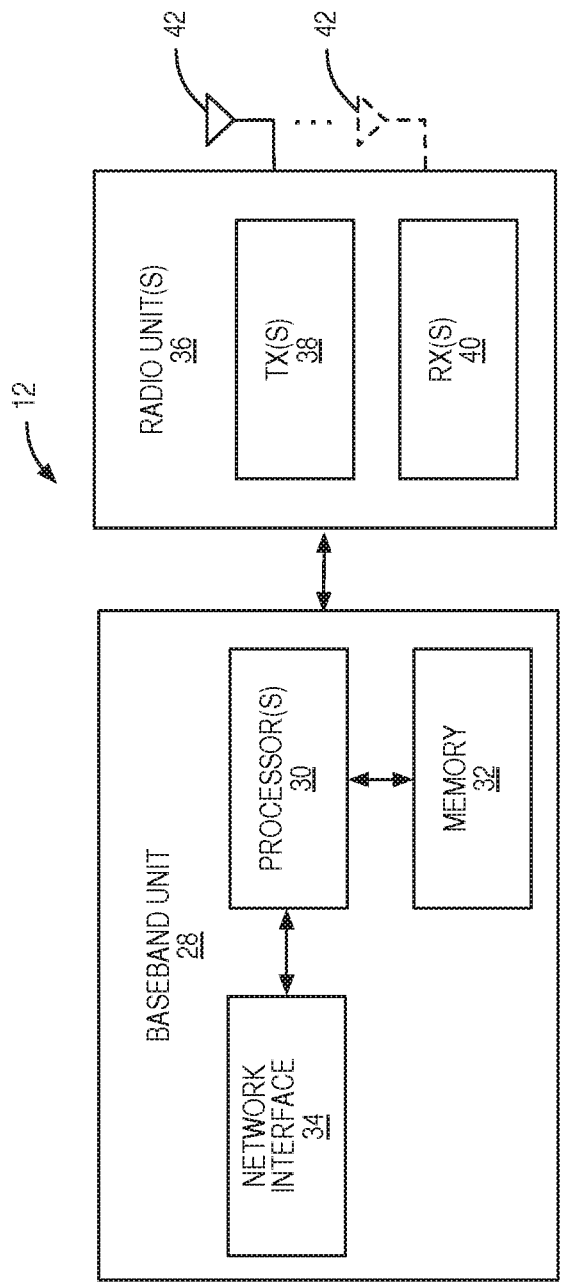
FIG. 8 is a diagram of a transmitter according to some embodiments of the present disclosure.

FIG. 8 is a diagram of a transmitter 12 according to some embodiments of the present disclosure. In some embodiments, transmitter 12 may be a base station such as an eNodeB. In other embodiments, the transmitter 12 may be a Wireless Local Area Network (WLAN) Access Point (AP). In some embodiments, the transmitter 12 is communicating using hybrid precoding and is using mmW technology such as the IEEE 802.11ay standard.

In some embodiments, the transmitter 12 includes circuitry containing instructions, which when executed, cause the transmitter 12 to implement the methods and functionality described herein. In one example, the circuitry can be in the form of processing means which may include a processor and a memory containing instructions. As illustrated, the transmitter 12 includes a baseband unit 28 that includes at least one processor 30 and memory 32. The baseband unit 28 also includes a network interface 34. As illustrated, the transmitter 12 also includes at least one radio unit 36 with one or more transmitters 38, one or more receivers 40, and one or more antennas 42. In some embodiments, the transmitter 12, or the functionality of the transmitter 12 described with respect to any one of the embodiments described herein, is implemented in software that is stored in, e.g., the memory 32 and executed by the processor 30. The network interface 34 may include one or more components (e.g., network interface card(s)) that connect the transmitter 12 to other systems.

In some embodiments, a computer program including instructions which, when executed by the at least one processor 30, causes the at least one processor 30 to carry out the functionality of the transmitter 12 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 32).

Figure 9:
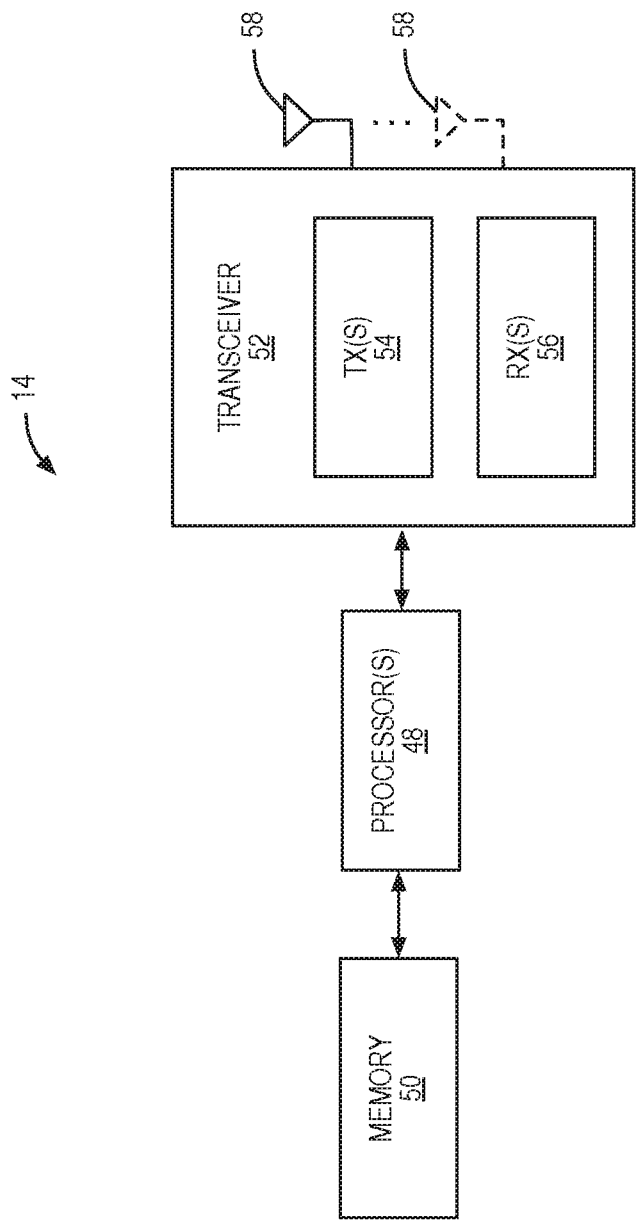
FIG. 9 is a diagram of a receiver according to some embodiments of the present disclosure.

FIG. 9 is a diagram of a receiver 14 according to some embodiments of the present disclosure. In some embodiments, receiver 14 may be a wireless device such as a User Equipment (UE). In other embodiments, the receiver 14 may be a WLAN station or client. In some embodiments, the receiver 14 is communicating using hybrid precoding and is using mmW technology such as the IEEE 802.11ay standard.

As illustrated, the receiver 14 includes at least one processor 48 and memory 50. The receiver 14 also includes a transceiver 52 with one or more transmitters 54, one or more receivers 56, and one or more antennas 58. In some embodiments, receiver 14, or the functionality of the receiver 14 described with respect to any one of the embodiments described herein, is implemented in software that is stored in, e.g., the memory 50 and executed by the processor 48. The transceiver 52 uses the one or more antennas 58 to transmit and receive signals and may include one or more components that connect the receiver 14 to other systems.

In some embodiments, a computer program including instructions which, when executed by at least one processor 48, causes the at least one processor 48 to carry out the functionality of the receiver 14 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 50).

Figure 10:
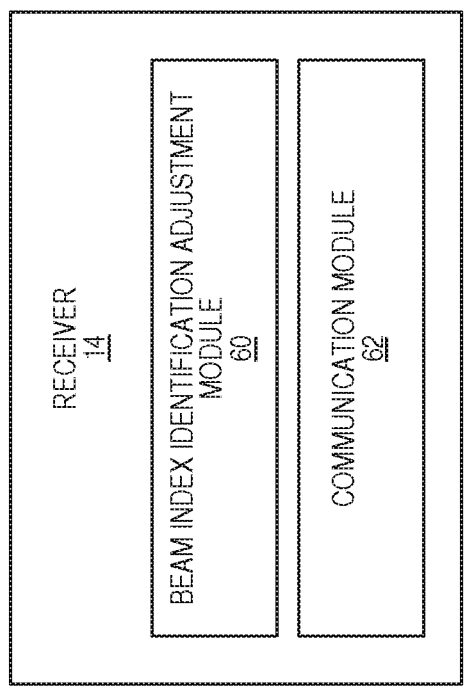
FIG. 10 is a diagram of a receiver including modules according to some embodiments of the present disclosure.

FIG. 10 is a diagram of a receiver 14 including a beam index identification adjustment module 60 and a communication module 62, according to some embodiments of the present disclosure. The beam index identification adjustment module 60 and the communication module 62 are each implemented in software that, when executed by a processor of the receiver 14, causes the receiver 14 to operate according to one of the embodiments described herein. The beam index identification adjustment module 60 operates to identify multiple sets of beam indices for use with transmissions from the transmitter 12 using hybrid precoding, as described above. The communication module 62 operates to communicate the sets of beam indices to the transmitter 12 for use with transmissions using hybrid precoding and receive a transmission from the transmitter 12 using one of the sets of beam indices, as described above.

Figure 11:
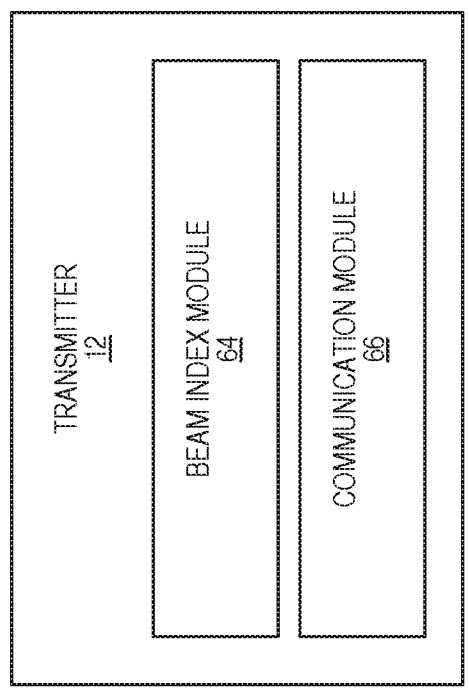
FIG. 11 is a diagram of a transmitter including modules according to some embodiments of the present disclosure.

FIG. 11 is a diagram of a transmitter 12 including a beam index module 64 and a communication module 66, according to some embodiments of the present disclosure. The beam index module 64 and the communication module 66 are each implemented in software that, when executed by a processor of the transmitter 12, causes the transmitter 12 to operate according to one of the embodiments described herein. The beam index module 64 operates to obtain multiple sets of beam indices for use with transmissions to a receiver 14 using hybrid precoding and select one of the sets of beam indices for use with transmissions to the receiver 14 using hybrid precoding, as described above. The communication module 66 operates to transmit a transmission to the receiver 14 using the selected one of the sets of beam indices, as described above.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the current disclosure is not limited to the embodiments described but can be practiced with modification and alteration within the spirit and scope of the appended claims. The description is thus to be regarded as illustrative instead of limiting.

The following acronyms are used throughout this disclosure.

3G $3^{rd}$ Generation
3GPP $3^{rd}$ Generation Partnership Project
4G $4^{th}$ Generation
5G $5^{th}$ Generation
BB Baseband
BF Beamforming
eNode B Enhanced Node B
Gbps Gigabits per second
GHz Gigahertz
HDMI High-Definition Multimedia Interface
IEEE Institute of Electrical and Electronics Engineers
LTE Long Term Evolution
LTE-A Long Term Evolution—Advanced
MIMO Multiple-Input Multiple-Output
mmW millimeter Wave
MU-MIMO Multi-User MIMO
RF Radio Frequency
SINR Signal-to-Interference-plus-Noise Ratio
SNR Signal-to-Noise Ratio
UE User Equipment
UMTS Universal Mobile Telecommunications System
USB Universal Serial Bus
WiMAX Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A method of operation of a receiver, comprising:
identifying a plurality of sets of analog beam indices for use with transmissions from a transmitter using hybrid precoding where each set of the plurality of sets of beam indices corresponds to a distinct transmission mode in a plurality of Multiple-Input Multiple-Output, MIMO, transmission modes, where the plurality of MIMO transmission modes comprises two or more MIMO transmission modes using different numbers of streams used for spatial multiplexing;
communicating the plurality of sets of beam indices to the transmitter for use with transmissions from the transmitter using hybrid precoding; and
receiving a transmission from the transmitter using one of the plurality of sets of beam indices.

2. The method of claim 1 wherein identifying a set of beam indices for each transmission mode comprises identifying a set of beam indices for each transmission mode that optimizes a predefined performance metric for that transmission mode.

3. The method of claim 2 further comprising receiving an indication of the plurality of MIMO transmission modes from the transmitter.

4. The method of claim 2 wherein the plurality of MIMO transmission modes comprises a plurality of predefined transmission modes.

5. The method of claim 1 wherein the plurality of MIMO transmission modes further comprises one or more MIMO transmission modes using different space-time-codes for diversity transmissions.

6. The method of claim 1 wherein the plurality of sets of beam indices for use with the transmissions from the transmitter using hybrid precoding comprises a plurality of sets of analog beam indices for a plurality of antennas associated with the transmitter.

7. The method of claim 6 wherein the plurality of sets of beam indices for use with transmissions from the transmitter using hybrid precoding comprises a plurality of sets of analog beam indices for a plurality of antennas associated with the receiver.

8. The method of claim 1 wherein identifying the plurality of sets of beam indices further comprises identifying one or more sets of beam indices for each transmission mode in a plurality of transmission modes.

9. The method of claim 8 wherein:
identifying the plurality of sets of beam indices further comprises identifying a plurality of values corresponding to a predefined performance metric for each of the plurality of sets of beam indices; and
communicating the plurality of sets of beam indices to the transmitter further comprises communicating the values corresponding to the predefined performance metric for one or more of the plurality of sets of beam indices to the transmitter.

10. The method of claim 9 wherein at least one of the predefined performance metrics is an indication of a signal strength for the transmission mode.

11. The method of claim 10 wherein at least one of the predefined performance metrics is an indication of a data throughput for the transmission mode.

12. The method of claim 11 wherein the transmitter and the receiver operate using a millimeter wave technology.

13. The method of claim 12 wherein the transmitter and the receiver operate according to the IEEE 802.11ay standard.

14. A method of operation of a transmitter, comprising:
obtaining a plurality of sets of analog beam indices for use with transmissions to a receiver using hybrid precoding where each set of the plurality of sets of beam indices corresponds to a distinct transmission mode in a plurality of Multiple-Input Multiple-Output, MIMO, transmission modes, where the plurality of MIMO transmission modes comprises two or more MIMO transmission modes using different numbers of streams used for spatial multiplexing;
selecting one of the plurality of sets of beam indices for use with transmissions to the receiver using hybrid precoding; and
transmitting a transmission to the receiver using the selected one of the plurality of sets of beam indices.

15. The method of claim 14 wherein the set of beam indices for each MIMO transmission mode optimizes a predefined performance metric for that transmission mode.

16. The method of claim 14 wherein the plurality of MIMO transmission modes further comprises one or more MIMO transmission modes using different space-time-codes for diversity transmissions.

17. The method of claim 14 wherein the plurality of sets of beam indices for use with transmissions to the receiver using hybrid precoding comprises a plurality of sets of analog beam indices for a plurality of antennas associated with the transmitter.

18. The method of claim 17 wherein the plurality of sets of beam indices for use with transmissions to the receiver using hybrid precoding comprises a plurality of sets of analog beam indices for a plurality of antennas associated with the receiver.

19. The method of claim 18 wherein:
obtaining the plurality of sets of beam indices further comprises obtaining values corresponding to a predefined performance metric for one or more of the plurality of sets of beam indices.

20. The method of claim 19 wherein at least one of the predefined performance metrics is an indication of a signal strength for the transmission mode.

21. The method of claim 20 wherein at least one of the predefined performance metrics is an indication of a data throughput for the transmission mode.

22. The method of claim 21 further comprising:
determining to change a transmission mode for transmissions to the receiver;
based on the change in the transmission mode for transmissions to the receiver, selecting a different one of the plurality of sets of beam indices for use with the transmissions to the receiver using hybrid precoding; and
transmitting a transmission to the receiver using the different selected one of the plurality of sets of beam indices.

23. The method of claim 21 further comprising:
obtaining a second plurality of sets of beam indices for use with transmissions to a second receiver using hybrid precoding;
selecting one of the second plurality of sets of beam indices for use with transmissions to the second receiver using hybrid precoding; and
at the same time as transmitting the transmission to the receiver, transmitting a second transmission to the second receiver using the selected one of the second plurality of sets of beam indices.

24. The method of claim 23 where selecting one of the plurality of sets of beam indices and selecting one of the second plurality of sets of beam indices comprises:
selecting the one of the plurality of sets of beam indices for use with transmissions to the receiver and selecting the one of the second plurality of sets of beam indices for use with transmissions to the second receiver in order to optimize a combined data throughput to the receiver and the second receiver.

25. The method of claim 21 wherein the transmitter and the receiver operate using a millimeter wave technology.

26. The method of claim 25 wherein the transmitter and the receiver operate according to the IEEE 802.11ay standard.

27. A method of operation of a transmitter and a receiver using hybrid precoding, comprising:
identifying, by the receiver, a plurality of sets of analog beam indices for use with transmissions from the transmitter using hybrid precoding where each set of the plurality of sets of beam indices corresponds to a distinct transmission mode in a plurality of Multiple-Input Multiple-Output, MIMO, transmission modes, where the plurality of MIMO transmission modes comprises two or more MIMO transmission modes using different numbers of streams used for spatial multiplexing;
communicating, by the receiver, the plurality of sets of beam indices to the transmitter for use with transmissions using hybrid precoding;
obtaining, by the transmitter, the plurality of sets of beam indices for use with transmissions to the receiver using hybrid precoding;

selecting, by the transmitter, one of the plurality of sets of beam indices for use with transmissions to the receiver using hybrid precoding;

transmitting, by the transmitter, a transmission to the receiver using the selected one of the plurality of sets of beam indices; and receiving, by the receiver, a transmission from the transmitter using the selected one of the plurality of sets of beam indices.

28. A receiver comprising:

a plurality of antennas; and circuitry configured to:

identify a plurality of sets of analog beam indices for use with transmissions from a transmitter using hybrid precoding where each set of the plurality of sets of beam indices corresponds to a distinct transmission mode in a plurality of Multiple-Input Multiple-Output, MIMO, transmission modes, where the plurality of MIMO transmission modes comprises two or more MIMO transmission modes using different numbers of streams used for spatial multiplexing;

communicate the plurality of sets of beam indices to the transmitter for use with transmissions from the transmitter using hybrid precoding; and receive a transmission from the transmitter using one of the plurality of sets of beam indices.

29. A transmitter comprising:

a plurality of antennas; and circuitry configured to:

obtain a plurality of sets of analog beam indices for use with transmissions to a receiver using hybrid precoding where each set of the plurality of sets of beam indices corresponds to a distinct transmission mode in a plurality of Multiple-Input Multiple-Output, MIMO, transmission modes, where the plurality of MIMO transmission modes comprises two or more MIMO transmission modes using different numbers of streams used for spatial multiplexing;

select one of the plurality of sets of beam indices for use with transmissions to the receiver using hybrid precoding; and transmit a transmission to the receiver using the selected one of the plurality of sets of beam indices.

\* \* \* \* \*